United States Patent
Illand et al.

(10) Patent No.: US 12,104,491 B2
(45) Date of Patent: Oct. 1, 2024

(54) METHOD FOR MANUFACTURING AN ABRADABLE SEALING ELEMENT, AND ABRADABLE SEALING ELEMENT

(71) Applicant: Safran Aircraft Engines, Paris (FR)

(72) Inventors: Hubert Jean-Yves Illand, Moissy-Cramayel (FR); Serge Georges Vladimir Selezneff, Moissy-Cramayel (FR); Guillaume Fradet, Moissy-Cramayel (FR); Laurent Paul Dudon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 247 days.

(21) Appl. No.: 17/629,273

(22) PCT Filed: Jul. 23, 2020

(86) PCT No.: PCT/EP2020/070776
§ 371 (c)(1),
(2) Date: Jan. 21, 2022

(87) PCT Pub. No.: WO2021/013920
PCT Pub. Date: Jan. 28, 2021

(65) Prior Publication Data
US 2022/0243604 A1 Aug. 4, 2022

(30) Foreign Application Priority Data

Jul. 23, 2019 (FR) ........................................ 1908330

(51) Int. Cl.
*F01D 11/12* (2006.01)
*C23C 4/12* (2016.01)
*F16J 15/44* (2006.01)

(52) U.S. Cl.
CPC .............. *F01D 11/122* (2013.01); *C23C 4/12* (2013.01); *F16J 15/445* (2013.01); *F05D 2240/55* (2013.01)

(58) Field of Classification Search
CPC .......... F01D 11/22; F01D 11/12; F01D 5/288; F05D 2240/55; F05D 2230/311;
(Continued)

(56) References Cited

U.S. PATENT DOCUMENTS

| 6,270,849 B1 | 8/2001 | Popoola et al. |
| 6,887,529 B2* | 5/2005 | Borneman ................ C23C 4/18 118/503 |
| 2002/0102360 A1* | 8/2002 | Subramanian ...... C23C 28/3215 427/383.1 |

(Continued)

FOREIGN PATENT DOCUMENTS

| CN | 108690945 A | * 10/2018 | ............ C04B 35/48 |
| CN | 113265608 A | * 8/2021 | |
| CN | 115029654 A | * 9/2022 | |

OTHER PUBLICATIONS

International Search Report for PCT/EP2020/070776 (PCT/ISA/210) mailed on Aug. 18, 2020.
(Continued)

*Primary Examiner* — Justin D Seabe
*Assistant Examiner* — Wayne A Lambert
(74) *Attorney, Agent, or Firm* — Birch, Stewart, Kolasch & Birch, LLP

(57) ABSTRACT

The present invention relates to a method for continuously manufacturing an abradable sealing element, this element comprising a support substrate covered by a coating comprising at least two successive layers, each comprising a sublayer of abradable material and a sublayer of erosion-control material. This method is noteworthy in that it comprises the steps consisting in: —a) placing at least one support substrate on a rotary carousel around which are
(Continued)

placed at least two thermal spray torches enabling the sublayer of abradable material and that of erosion-control material to be deposited, —b) rotating the carousel so as to bring said support substrate successively opposite one then the other of the two torches and to carry out the deposition of the various sublayers and to repeat this operation so as to obtain said sealing element.

18 Claims, 5 Drawing Sheets

(58) Field of Classification Search
CPC .. F16J 15/445; C23C 4/12; C23C 4/00; C23C 4/04; C23C 4/06; C23C 4/073; C23C 4/129; C23C 4/134
See application file for complete search history.

(56) References Cited

U.S. PATENT DOCUMENTS

| | | | |
|---|---|---|---|
| 2011/0086177 A1* | 4/2011 | Ma | C23C 4/134 427/398.1 |
| 2013/0129494 A1* | 5/2013 | Duchaine | F04D 19/00 415/213.1 |
| 2015/0252464 A1* | 9/2015 | Hazel | C23C 4/134 118/302 |
| 2018/0252119 A1* | 9/2018 | Whalen | C23C 24/082 |
| 2019/0032504 A1 | 1/2019 | Shi et al. | |

OTHER PUBLICATIONS

Written Opinion of the International Searching Authority for PCT/EP2020/070776 (PCT/ISA/237) mailed on Aug. 18, 2020.

* cited by examiner

METHOD FOR MANUFACTURING AN ABRADABLE SEALING ELEMENT, AND ABRADABLE SEALING ELEMENT

FIELD OF THE INVENTION

The invention lies in the field of aeronautics.

It relates more specifically to a method for continuously manufacturing an abradable sealing element for a turbomachine. This sealing element is preferably intended to be mounted on a casing of a rotor wheel or a root of a distributor of a turbine or of a turbomachine compressor.

It also relates to this abradable sealing element as well as to a turbine or to a compressor comprising same.

STATE OF THE ART

Conventionally, a turbomachine comprises, from upstream to downstream, successively a low pressure compressor, a high pressure compressor, a combustion chamber, a high pressure turbine and a low pressure turbine, which are traversed by an air flow.

The attached FIG. 1 represents an exemplary embodiment of a turbomachine turbine. The gas flow flows inside the turbine from upstream AM to downstream AV in the direction of flow represented by arrow V.

This turbine comprises several successive stages, each stage comprising a distributor 1 and a rotor wheel 2. The latter are placed inside an annular casing 3 of substantially frustoconical shape, of axis X-X'. The rotor wheel 2 rotates around the axis X-X'. The casing 3 forms an outer shroud for the turbine.

Each rotor wheel 2 comprises a disc 20 which carries at its periphery a plurality of radial vanes 21. The various discs 20 are assembled together and fixed on a rotation shaft (not shown in the figures) which simultaneously drives them in rotation. Each distributor 1 comprises a plurality of radial vanes 10, the radially outer end of which is fixed to the casing 3.

A ring, made of several elements of abradable material 30 placed end to end circumferentially, is fixed on the internal face of the casing 3, opposite the radially outer end of the rotor vanes 21. During the operation of the turbine, the top of the vanes 21 (optionally provided with lips 210) penetrates into the abradable material of the element 30. This allows to have little or no clearance, which is essentially radial, between the top of the moving vanes 21 and the casing 3. This ensures the aerodynamic performance of the turbine and therefore of the turbomachine.

For the same reasons of aerodynamic performance, an annular distributor root 12 supports several elements of abradable material 11 placed end to end circumferentially. It is arranged at the radially inner end of the fixed vanes 10, so as to be located opposite an annular flange 22, itself fixed between two neighboring rotor discs 21. This flange 22 is provided with at least one annular lip 23 which penetrates into the abradable material 11, during the operation of the turbine.

The flow path of a turbomachine is the site of a rapid flow of air and various particles. It is therefore desirable that the abradable material of the elements 30 and 11 is both abradable, (that is to say that it wears preferentially compared to the vanes 21 or to the lips 23) and resistant to erosion with respect to particles. However, these two properties are antagonistic, which poses problems in the development of abradable materials.

The compressor of a turbomachine has a similar structure with regard to the abradable elements.

A high performance component comprising a support substrate covered by a multilayer abradable track, as well as the manufacturing method thereof are already known from document US 2019/032504.

However, this document does not describe the manufacturing method in accordance with the invention, nor an abradable sealing element comprising sublayers of abradable material having a mechanical resistance to wear decreasing from the sublayer closest to the support substrate to the one farthest from this support substrate.

DISCLOSURE OF THE INVENTION

A purpose of the invention is therefore to provide an abradable sealing element, which comprises a support substrate, covered by a coating which is both abradable and resistant to erosion, this abradable element being able to be fixed, preferably, on the internal face of the casing 3, facing the radially outer end of the rotor vanes 21 or on the radially inner end of the fixed radial vanes 10 of the distributor, more precisely on the distributor root 12, facing the lips 23.

Another purpose of the invention is to provide a method for manufacturing such an abradable sealing element.

To this end, the invention relates to a method for continuously manufacturing an abradable sealing element for a turbomachine, this sealing element comprising a support substrate covered by a coating comprising at least two successive layers, each layer comprising a sublayer of abradable material and a sublayer of anti-erosion material and the various layers being placed in a direction of stacking of layers, so that a sublayer of abradable material is alternated with a sublayer of anti-erosion material.

According to the invention, this method comprises the steps consisting in:

a) placing at least one support substrate on a rotary carousel around which are placed at least two thermal spray torches, one of the two torches enabling the sublayer of abradable material to be deposited and the other of the two torches enabling the sublayer of anti-erosion material to be deposited, b) rotating the carousel so as to bring said support substrate successively opposite one then the other of the two thermal spray torches and to carry out the deposition of the sublayer of anti-erosion material and the deposition of the sublayer of abradable material and to repeat this operation of rotating the carousel and depositing the sublayers so as to obtain said abradable sealing element.

Thanks to these features of the invention, it is possible to industrially and continuously manufacture an abradable sealing element which is resistant to erosion.

According to other advantageous and non-limiting features of the invention, taken alone or in combination:

said thermal spray torches are plasma torches;

the method consists in placing N support substrates on the rotary carousel, regularly spaced at an angle of 360°/N, on the periphery of the carousel;

the method consists in depositing at least three successive stacked layers, on said support substrate, so as to form said coating and the various sublayers of abradable material of this coating have a mechanical resistance to wear which decreases from the sublayer of abradable material closest to the support substrate to that farthest from this support substrate in the direction of stacking of the layers;

the various sublayers of anti-erosion material and the various sublayers of abradable material are deposited such that the various sublayers of anti-erosion material have the same thickness and/or in that the various sublayers of abradable material have the same thickness;

the various sublayers of anti-erosion material and the various sublayers of abradable material are deposited such that for each layer, the sublayer of abradable material is at least ten times thicker than the sublayer of anti-erosion material;

each deposited anti-erosion sublayer comprises a material selected from materials based on iron or nickel, such as nickel/chromium/aluminum alloys or from ceramic materials;

the material of the abradable sublayer is selected from the materials of the group of rare earth elements.

The invention also relates to an abradable sealing element for a turbomachine.

In accordance with the invention, this element is obtained by the aforementioned method, it comprises a support substrate covered by a coating comprising at least two successive layers, preferably at least three successive layers, each layer comprises a sublayer of abradable material and a sublayer of anti-erosion material, the various layers are placed, in a direction of stacking of the layers, so that a sublayer of abradable material is alternated with a sublayer of anti-erosion material and the various sublayers of abradable material have a mechanical resistance to wear which decreases from the sublayer of abradable material closest to the support substrate to that farthest from this support substrate in the direction of stacking of the layers.

According to other features of the invention taken alone or in combination:

the various stacked layers are in contact with each other;

the various sublayers of anti-erosion material have the same thickness and/or the various sublayers of abradable material have the same thickness;

for each layer, the sublayer of abradable material is at least ten times thicker than the sublayer of anti-erosion material;

the thickness of each sublayer of anti-erosion material is comprised between 1 µm and 50 µm;

each anti-erosion sublayer comprises a material selected from materials based on iron or nickel, such as nickel/chromium/aluminum alloys or from ceramic materials;

the material of the abradable sublayer is selected from the materials of the group of rare earth elements.

The invention also relates to a turbine or a turbomachine compressor comprising at least one rotor wheel and a distributor, placed inside a casing, the rotor wheel comprising a plurality of radial vanes, said casing comprising on its internal face at least one abradable sealing element, disposed facing the radially outer ends of said rotor vanes.

According to the invention, said at least one abradable sealing element is an element as mentioned above and said rotor wheel is placed so that its radial vanes come into contact with the layers of the coating of said abradable sealing element.

Finally, the invention relates to a turbine or a turbomachine compressor comprising at least two rotor wheels and a distributor, each rotor wheel comprising a rotor disc provided at its periphery with a plurality of radial vanes, the distributor comprising a plurality of radial vanes, at least one of said distributor vanes supporting, at its radially inner end, at least one abradable sealing element.

According to the invention, said at least one abradable sealing element is an element as mentioned above, a flange provided with at least one annular sealing lip is fixed between said two rotor discs and said sealing lip is placed so as to come into contact with the layers of the coating of said abradable sealing element.

DESCRIPTION OF FIGURES

Other features, purposes and advantages of the invention will emerge from the following description, which is purely illustrative and non-limiting, and which should be read with reference to the appended drawings in which.

In all of the figures, similar elements bear identical references.

DETAILED DESCRIPTION OF THE INVENTION

Figure 1:
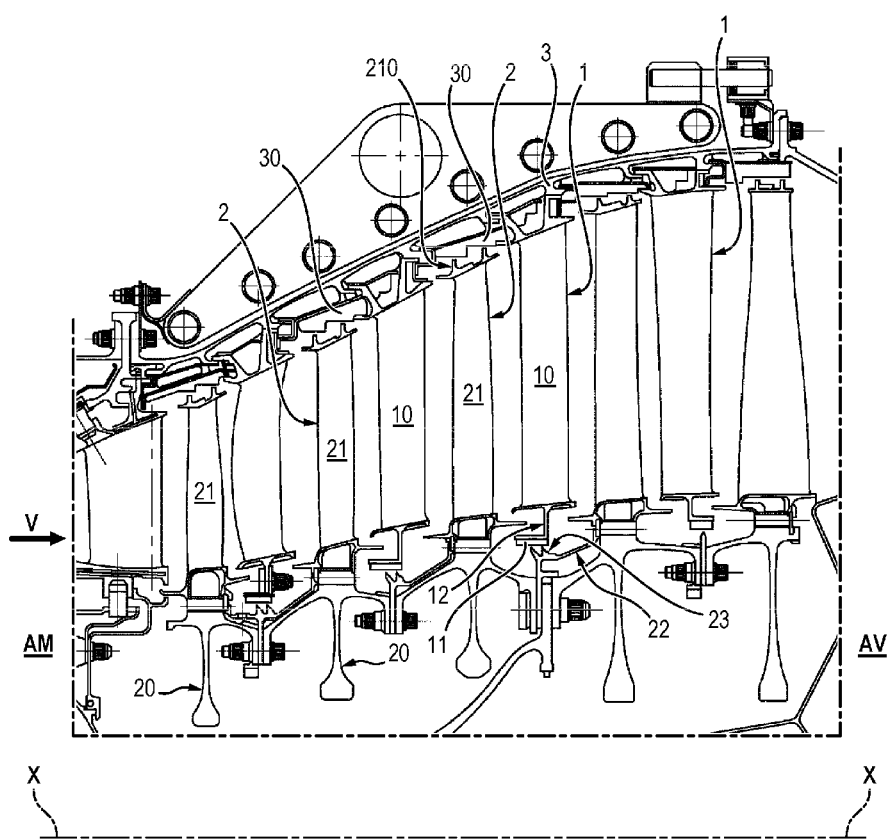
FIG. 1 is an axial sectional view of part of a turbine of a turbomachine.
Figure 2:
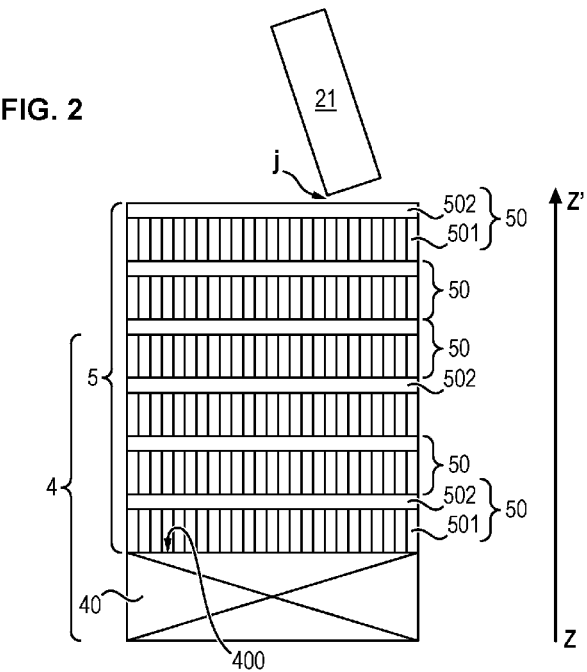
FIG. 2 is a diagram showing an abradable sealing element according to the invention.

The invention relates to an abradable element 4, such as that shown schematically in FIG. 2. This abradable element 4 is preferably intended to replace at least one of the abradable elements 30 and/or of the abradable elements 11 of the turbine of FIG. 1 or of a compressor not shown in the figures.

The abradable element 4 comprises a support substrate 40 covered by a coating 5.

The support substrate 40 preferably has the shape of a ring sector curved so as to form a circular arc. These different ring sectors are intended to be placed end to end circumferentially, so as to form a complete ring, which is fixed to the internal face of the casing 3. The support substrate 40 could also be a complete ring.

The concave face of this support substrate is the radially internal face thereof and it is this face which is covered by the coating 5. The support substrate 40 can be made of metal, ceramic or a ceramic matrix composite (CMC).

The coating 5 comprises at least two successive layers 50, which are preferably superimposed. Each layer 50 comprises a sublayer of an abradable material 501 and a sublayer of an anti-erosion material 502, which is more mechanically resistant than the abradable sublayer 501, that is to say which is less likely to break. A preferred embodiment of the invention, described later, comprises at least three successive layers 50.

Preferably, the stack of layers 50 is made so that an anti-erosion sublayer 502 is the last of the stack, that is to say that it is located at the end opposite to the substrate 40 according to the direction of stacking of the layers.

The direction of stacking of the layers starts from the substrate 40 and moves away from it. It is materialized by the arrow Z-Z' in FIG. 2.

The first sublayer in contact with the substrate 40 can equally well be a sublayer 501 or 502.

The technical solution in accordance with the invention consists in alternating abradable sublayers 501 with anti-erosion sublayers 502 which are more mechanically resistant than the abradable sublayers 501. When in contact with a moving part (for example in FIG. 2, a rotor vane 21), the penetration of the vane will remove the first anti-erosion sublayer 502 by shearing the abradable sublayer 501 from below, with a minimum force and abrasion for the moving vane 21.

Erosion by the particles circulating in the air flow then eliminates the residues of the abradable sublayer 501 and stops at the level of the next anti-erosion sublayer 502. During operation of the turbine, the vanes 21, or lips 23, expand further radially towards the abradable element, so that a subsequent layer 50 may in turn be degraded, as has just been described and this operation can be repeated.

The thinner the various sublayers 501, 502, the smaller the residual clearance j between the top of the vane 21 and the facing surface of the coating 5, and therefore the more the sealing and the efficiency of the turbine are guaranteed.

Advantageously, the various sublayers 501 of abradable material are of the same thickness relative to each other.

Preferably, the various sublayers of anti-erosion material 502 are of the same thickness relative to each other.

Also preferably, the sublayer of abradable material 501 is thicker than the sublayer of anti-erosion material 502, more preferably at least ten times thicker.

Preferably, the sublayer of anti-erosion material 502 is of a thickness less than 0.1 mm, more preferably comprised between 1 μm and 50 μm. Thus, this anti-erosion layer does not alter the abradability of the sublayer 501.

Advantageously, the coating 5 comprises between ten and a thousand layers 50.

The material constituting the anti-erosion sublayer 502 is advantageously selected from materials based on iron or nickel, such as nickel/chromium/aluminum alloys (NiCrAl). The material of the anti-erosion sublayer 502 can also be ceramic in nature.

The material constituting the sublayer of abradable material 501 is advantageously selected from materials from the group of rare earth elements.

According to a first variant embodiment of the coating 5, the various sublayers of abradable material 501 have the same mechanical strength relative to each other, and moreover, the various sublayers of anti-erosion material 502 have the same mechanical strength relative to each other. In addition, the anti-erosion sublayers 502 are more mechanically resistant than the abradable sublayers 501.

Figure 3:
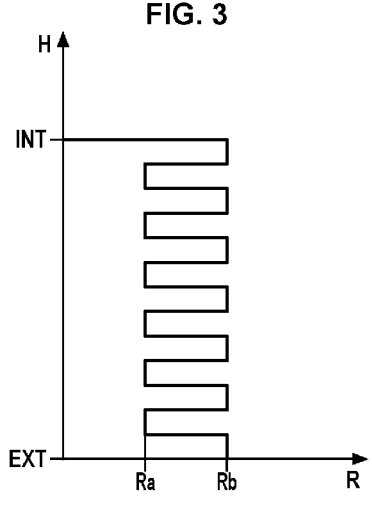
FIG. 3 is a graph showing the mechanical resistance to wear R of an example of coating of the abradable element, as a function of the height H of this coating.

This scenario is illustrated in FIG. 3, which is a diagram showing the evolution of the mechanical resistance to wear R of the various sublayers as a function of the height H of the coating 5, from the radially external area EXT of the coating (closest to the support substrate 40), up to the radially internal area (INT) of this substrate. In this diagram, it can be seen that the anti-erosion sublayers 502 all have a mechanical resistance to wear Rb and that the sublayers of abradable material 501 all have a mechanical resistance to wear Ra, with Rb greater than Ra.

Figure 4:
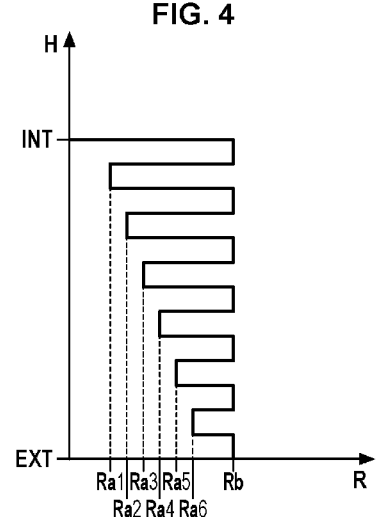
FIG. 4 is a graph showing the mechanical resistance to wear R of another example of coating of the abradable element, as a function of the height H of this coating.

According to a preferred variant embodiment of the invention, the coating 5 comprises at least two layers 50, preferably at least three layers 50, each comprising the two sublayers 501 and 502 with a variation in mechanical resistance to wear of the sublayers 502 over the height H of the coating (see FIG. 4). Thus, while the mechanical resistance to wear of the anti-erosion material 502 is constant (value Rb), the mechanical resistance to wear of the sublayer 501 of abradable material varies and it increases from the radially inner end (INT) of the coating 5 to the radially outer end thereof, (EXT side). Thus, with each new sublayer 501 of abradable material, the mechanical resistance to wear Ra increases, here with six sublayers it is seen that the values Ra1, Ra2, Ra3, Ra4, Ra5, Ra6 are increasing, all these values being furthermore less than Rb.

Thus, having a lower mechanical resistance to wear of the abradable sublayers 501 in contact with the moving vane 21 can avoid a direct rupture of an abradable sublayer 501 closer to the support substrate 40.

One possibility for varying the mechanical resistance to wear of a sublayer consists in acting on its density. The denser a sublayer, the more mechanically resistant it will be.

An example of a method for manufacturing the abradable element 4 mentioned above will now be described in connection with FIGS. 5A to 8.

The method according to the invention is an industrial method, which allows to manufacture the coating 5 continuously, at a high rate, by coating at least one support substrate 40 and preferably several tens of support substrates simultaneously.

Figure 8:
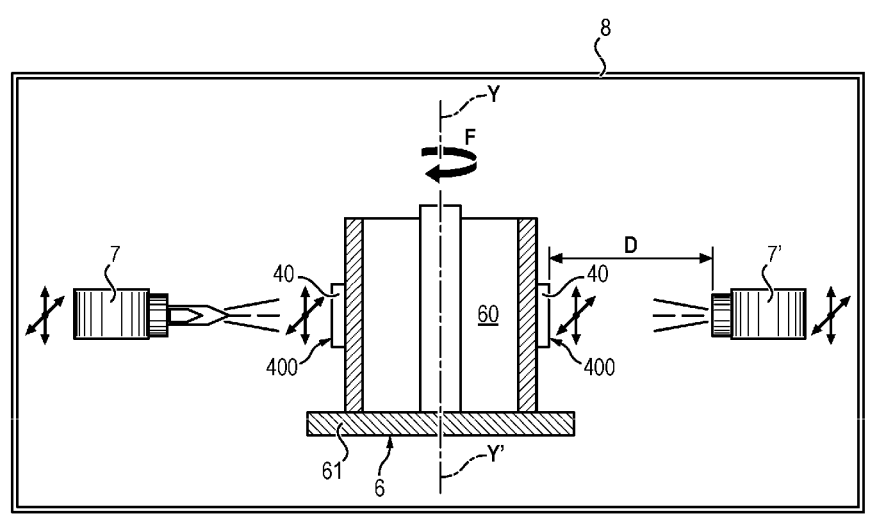
FIG. 8 is a diagram showing the installation allowing the implementation of the method in accordance with the invention.

The method in accordance with the invention is implemented in an installation such as, for example, that shown in FIG. 8. Said installation comprises a carousel 6, which is preferably motorized, at least two thermal spray torches 7, 7', all of the above being preferably placed in a spray enclosure 8.

The carousel 6 comprises a base 60, fixed on a rotary plate 61, driven in rotation about a vertical axis Y-Y'. The support substrates 40 are placed on the outer face of the base 60, so that their curved internal face 400 is located facing the spray torches 7, 7'.

The torches 7, 7' can for example be selected from air plasma spray torches, known by the acronym "APS" (which means "Air Plasma Spraying") or spray torches using a mixture of high velocity fuel and oxygen, known by the acronym of "HVOF" (which means "High Velocity Oxygen Fuel"). These different types of torches allow to have different powder formulations and thus to deposit either the sublayer of abradable material 501 or the sublayer of anti-erosion material 502.

Advantageously, at least one of the torches 7, 7' can have one or two degrees of freedom and its displacement can optionally be programmable. This torch can for example be mounted on a robotic articulated arm, so as to pivot for example to the left or to the right relative to the axis of rotation Y-Y', or up or down relative to the vertical position of the carousel 6 shown in FIG. 8.

Advantageously, the distance D between the support substrate 40 to be covered and the spray torch 7 or 7' can be adjustable.

The carousel 6 is driven in rotation (arrow F), either continuously or in an indexed manner in 360/N degrees of angle, N being the number of support substrates 40 fixed on the carousel, so as to sequentially bring each support substrate 40 in front of a torch 7 or 7'. For example, when six support substrates 40 are distributed over the carousel 6, this sequenced displacement will take place sixty degrees by sixty degrees.

One of the torches, for example the torch 7, allows to deposit the sublayer of abradable material 501 and the other, for example the torch 7', the layer of anti-erosion material 502.

In the example shown in the figures, the torches 7 and 7' are placed at 180° from each other. However, this angular placement could be different. Furthermore, as shown for example in FIGS. 5A to 5C, it is possible to place around the carousel 6, a device 80 spraying a jet of cooling air, preferably after the passage of the support substrate 40 in front of the two torches 7 and 7'.

Advantageously, the support substrate 40 is prepared before being fixed to the carousel 6. It is for example possible to subject it to a mechanical or chemical pickling, followed by a cleaning step allowing to remove the pickling residues, this cleaning being able to be carried out for example in a solvent bath. It is also possible to then deposit on this substrate 40, a sublayer for adhesion of the coating 5 which will be deposited subsequently.

The support substrate 40 can then be fixed on the carousel 6.

Advantageously, and as shown in the figures, the support substrate 40 can be fixed on the base 60 by means of a device which also allows one or two degrees of freedom, for example an upward or downward or rightward or leftward movement. This allows, for example, to scan the beam sprayed by the torch 7 or 7' onto the surface of the support substrate 40 to be covered.

Figure 5A:
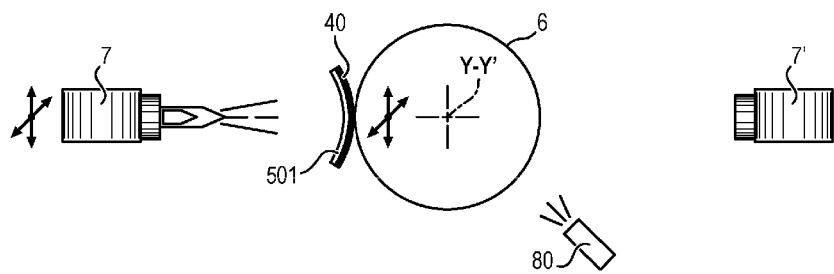
FIG. 5A is a diagram showing a first step of the continuous manufacturing method in accordance with a first embodiment of the invention.
Figure 5B:
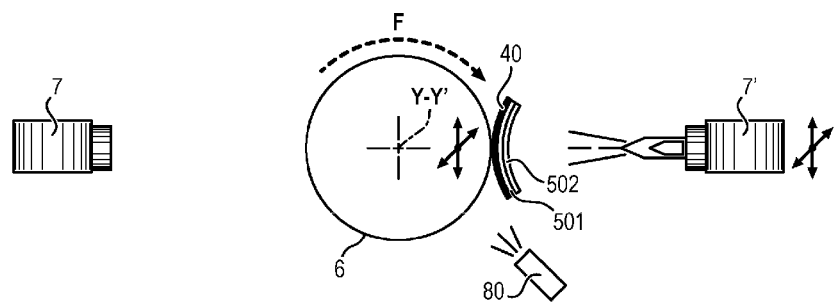
FIG. 5B is a diagram showing a second step of the continuous manufacturing method in accordance with a first embodiment of the invention.
Figure 5C:
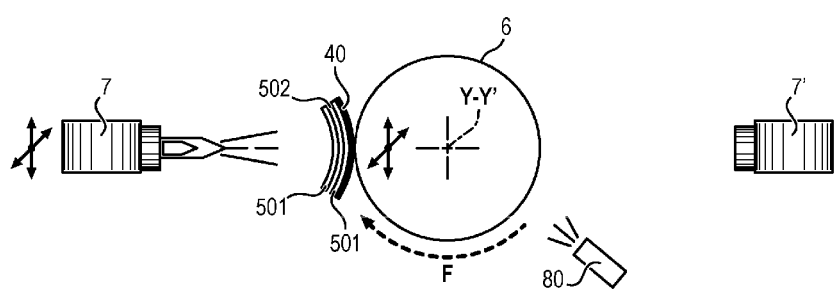
FIG. 5C is a diagram showing a third step of the continuous manufacturing method in accordance with a first embodiment of the invention.

In the exemplary embodiment shown in FIGS. 5A to 5C, a single support substrate 40 is fixed on the carousel 6.

The carousel 6 is positioned so that the substrate 40 is in front of one of the two torches, for example in front of the torch 7 (FIG. 5A). The first sublayer is deposited, for example the sublayer of abradable material 501, then the carousel 6 is driven in rotation so as to bring the substrate 40 in front of the other torch 7' and to carry out the deposition of the other sublayer, here 502 (FIG. 5B). The rotation of the carousel 6 is continued and after passing in front of the optional device for spraying the air jet 80, the substrate 40 is in front of the first torch 7 (FIG. 5C) to again receive a sublayer of abradable material 501. This cycle is repeated as many times as is necessary to obtain the desired number of sublayers 501, 502, on the substrate 40.

Figure 6A:
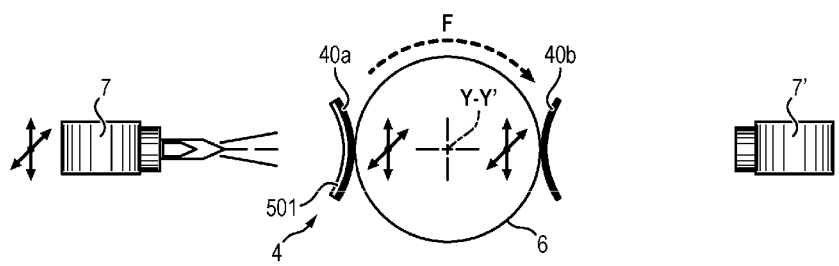
FIG. 6A is a diagram showing a first step of the continuous manufacturing method in accordance with a second embodiment of the invention.
Figure 6B:
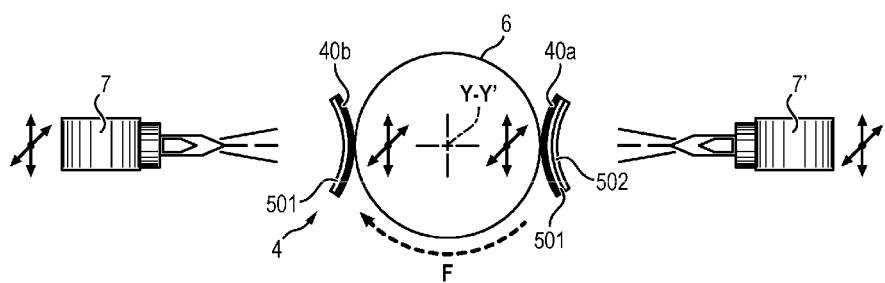
FIG. 6B is a diagram showing a second step of the continuous manufacturing method in accordance with a second embodiment of the invention.
Figure 6C:
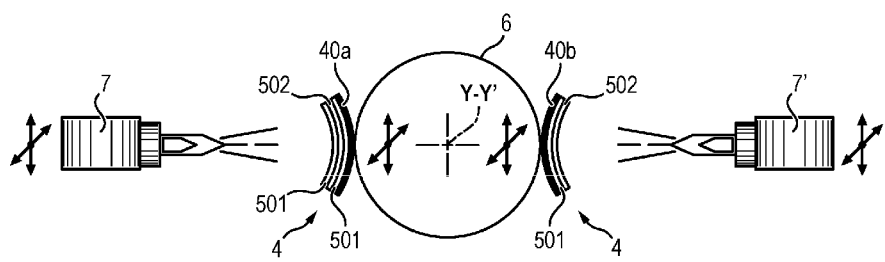
FIG. 6C is a diagram showing a third step of the continuous manufacturing method in accordance with a second embodiment of the invention.

FIGS. 6A to 6C illustrate a variant embodiment of the method according to which two support substrates 40a, 40b are fixed on the carousel 6, preferably at 180° from each other, which allows to increase the production rate.

At the start, the substrate 40a is positioned in front of the torch 7 and the substrate 40b in front of the torch 7'. The sublayer formed by the torch 7 (for example 501) is deposited on the substrate 40a, while the torch 7' is not initially supplied, so that the substrate 40b remains blank.

In the next step shown in FIG. 6B, the carousel 6 has rotated by 180°, so that the substrate 40a covered by a first abradable sublayer 501 then receives a first anti-erosion sublayer 502, while the substrate 40b receives a first abradable sublayer 501, deposited directly on the substrate 40b.

The rotations of 180° are continued, so as to bring the two substrates 40a and 40b alternately in front of one or the other of the two torches 7 and 7' and thus to obtain the desired number of sublayers 501 and 502.

Figure 7:
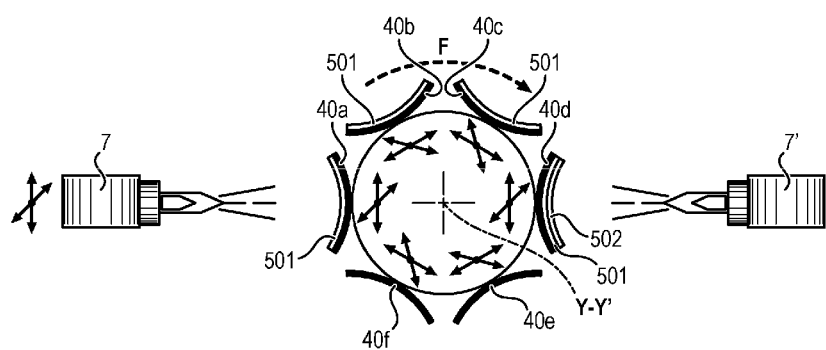
FIG. 7 is a diagram showing a third embodiment of the continuous manufacturing method in accordance with the invention.

FIG. 7 shows an alternative embodiment in which six support substrates 40a, 40b, 40c, 40d, 40e and 40f are placed on the carousel 6.

For example, up to thirty-two support substrates 40 (or even more) can thus be placed on a carousel 6. Advantageously, and in order to increase the deposition rates, several pairs of torches 7 and 7' can then be placed around the carousel 6.

The deposition parameters of the two torches 7 and 7' are advantageously adjusted so that the thickness of the sublayer of abradable material 501 is greater than that of the sublayer of anti-erosion material 502, as explained above.

For this purpose, it is possible to act on various parameters, such as for example the flowrate of material sprayed, the rate of deposition or the spray angle.

The material flowrates can be different. By acting on the ratio between the flowrates of the two sublayers 501 and 502 and on the ratio between their respective densities, it is thus possible to obtain different thicknesses.

By way of purely illustrative example, if a sublayer of abradable material 501 of AlSiBN is deposited at a rate of 100 g per minute and a sublayer of anti-erosion material of AlNi is deposited at a rate of 20 g per minute (flowrate ratio of five), knowing that the density of AlSiBN is five times less than that of AlNi, then a deposition of anti-erosion material ten times thinner than that of the layer of abradable material is achieved.

The deposition rate determines the thickness of the deposited layer, when the deposition is carried out in a single pass (the slower it is, the thicker the deposit). To obtain a thicker layer, it is also possible to act on the torches 7 or 7' to make them undergo a sweeping and reciprocating movement, before the carousel 6 is driven in rotation for the next step.

Finally, it will be noted that the deposited thickness varies according to the sine of the spray angle. The more the spray angle is closed (grazing) relative to the coated surface, the larger the covered area will be. The deposited thickness will also be smaller. It is generally preferable not to exceed an angle of 45° relative to the normal to the surface to be covered.

Thanks to these features of the invention, it is thus possible to continuously produce a large number of abradable sealing elements 4 having a large number of sublayers having different features and thus to obtain an overall coating 5 benefiting from all the advantages of each of the sublayers 501, 502, without the drawbacks (namely an abradable material character with good resistance to erosion).

The invention claimed is:

1. A method for continuously manufacturing an abradable sealing element for a turbomachine,
    wherein this sealing element comprises a support substrate covered by a coating comprising at least three successive stacked layers, each of these at least three successive layers comprising a sublayer of abradable material and a sublayer of anti-erosion material and the various layers being placed in a direction of stacking of layers, so that a sublayer of abradable material is alternated with a sublayer of anti-erosion material, and wherein the various sublayers of abradable material of this coating have a mechanical resistance to wear which decreases from the sublayer of abradable material closest to the support substrate to that farthest from this support substrate in the direction of stacking of these layers,
wherein this method comprises the steps of:
a) placing at least one support substrate on a rotary carousel around which are placed at least two thermal spray torches, one of the two torches enabling the sublayer of abradable material to be deposited and the other of the two torches enabling the sublayer of anti-erosion material to be deposited,
b) rotating the carousel so as to bring said support substrate successively opposite one then the other of the two thermal spray torches and to carry out the deposition of the sublayer of anti-erosion material and the deposition of the sublayer of abradable material and to repeat this operation of rotating the carousel and depositing the sublayers so as to obtain said abradable sealing element.

2. The continuous manufacturing method according to claim 1, wherein said thermal spray torches are plasma torches.

3. The continuous manufacturing method according to claim 1, wherein the method consists in placing N support substrates on the rotary carousel, regularly spaced at an angle of 360°/N, on the periphery of the carousel.

4. The continuous manufacturing method according to claim 1, wherein the sublayers of anti-erosion material and the sublayers of abradable material are deposited such that the sublayers of anti-erosion material have the same thickness and/or in that the sublayers of abradable material have the same thickness.

5. The continuous manufacturing method according to claim 1, wherein the sublayers of anti-erosion material and the sublayers of abradable material are deposited such that for each layer, the sublayer of abradable material is at least ten times thicker than the sublayer of anti-erosion material.

6. The continuous manufacturing method according to claim 1, wherein each deposited anti-erosion sublayer comprises a material selected from materials based on iron or nickel or from ceramic materials.

7. The continuous manufacturing method according to claim 1, wherein the material of the abradable sublayer is selected from the materials of the group of rare earth elements.

8. An abradable sealing element for a turbomachine,
wherein the abradable sealing element is obtained by the method according to claim 1,
wherein the abradable sealing element comprises a support substrate covered by a coating comprising at least three successive layers,
wherein each layer comprises a sublayer of abradable material and a sublayer of anti-erosion material,
wherein the various layers are placed in a direction of stacking of the layers so that a sublayer of abradable material is alternated with a sublayer of anti-erosion material
and wherein the various sublayers of abradable material have a mechanical resistance to wear which decreases from the sublayer of abradable material closest to the support substrate to that farthest from this support substrate in the direction of stacking of the layers.

9. The sealing element according to claim 8, wherein the various stacked layers are in contact with each other.

10. The sealing element according to claim 8, wherein the various sublayers of anti-erosion material have the same thickness and/or in that the various sublayers of abradable material have the same thickness.

11. The sealing element according to claim 8, wherein for each layer, the sublayer of abradable material is at least ten times thicker than the sublayer of anti-erosion material.

12. The sealing element according to claim 8, wherein the thickness of each sublayer of anti-erosion material is comprised between 1 μm and 50 μm.

13. The sealing element according to claim 8, wherein each anti-erosion sublayer comprises a material selected from materials based on iron or nickel or from ceramic materials.

14. The sealing element according to claim 8, wherein the material of the abradable sublayer is selected from the materials of the group of rare earth elements.

15. The continuous manufacturing method according to claim 6, wherein each deposited anti-erosion sublayer comprises a material selected from nickel/chromium/aluminum alloys.

16. The continuous manufacturing method according to claim 1, wherein the value of the mechanical resistance to wear of the anti-erosion material is constant and wherein all the values of the mechanical resistance to wear of the sublayers of abradable material are less than the value of the mechanical resistance to wear of the anti-erosion material.

17. The sealing element according to claim 13, wherein each anti-erosion sublayer comprises a material selected from nickel/chromium/aluminum alloys.

18. The sealing element according to claim 8, wherein the value of the mechanical resistance to wear of the anti-erosion material is constant and wherein all the values of the mechanical resistance to wear of the sublayers of abradable material are less than the value of the mechanical resistance to wear of the anti-erosion material.

* * * * *